W. J. MOORE & R. MANSON.
AUTOMOBILE TOP.
APPLICATION FILED MAR. 17, 1914.
1,151,033.
Patented Aug. 24, 1915.
3 SHEETS—SHEET 3.
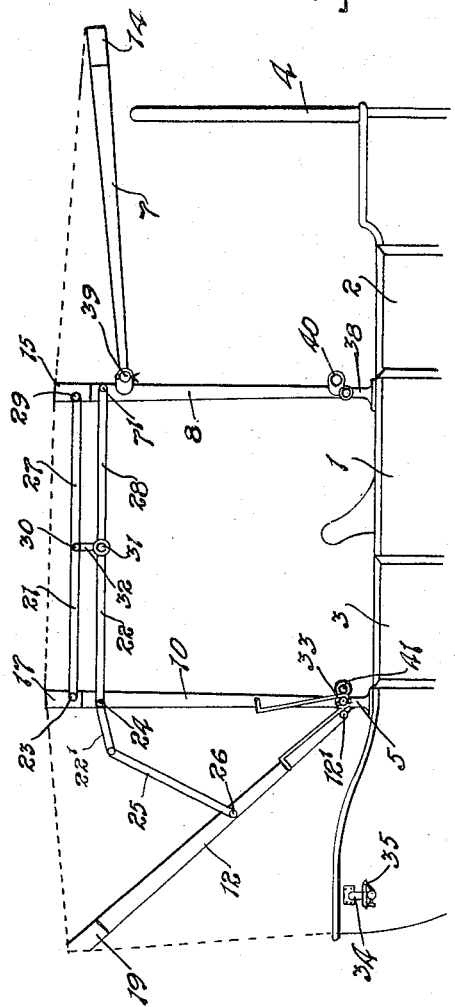
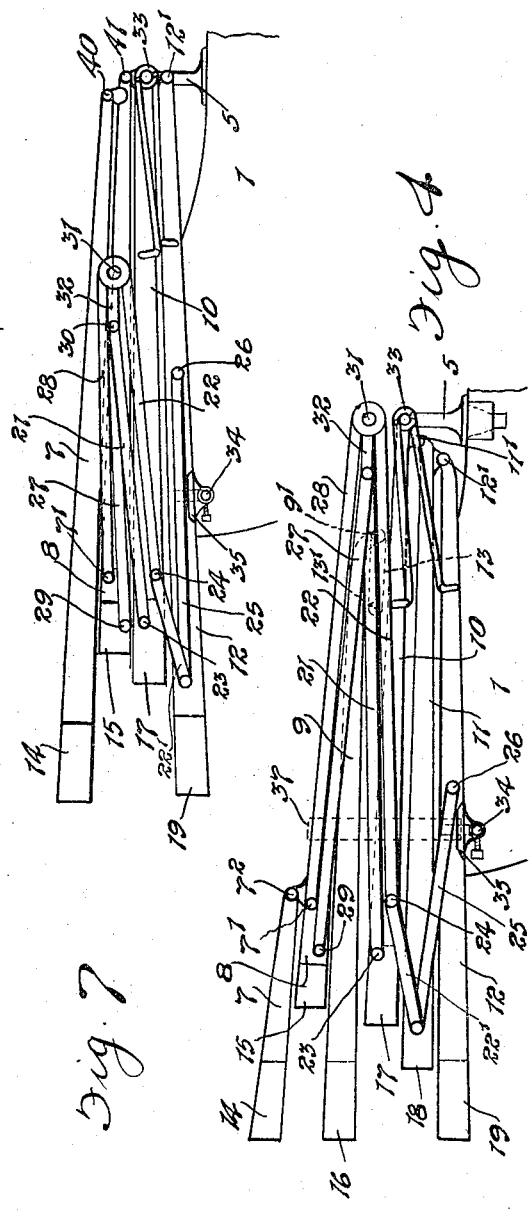

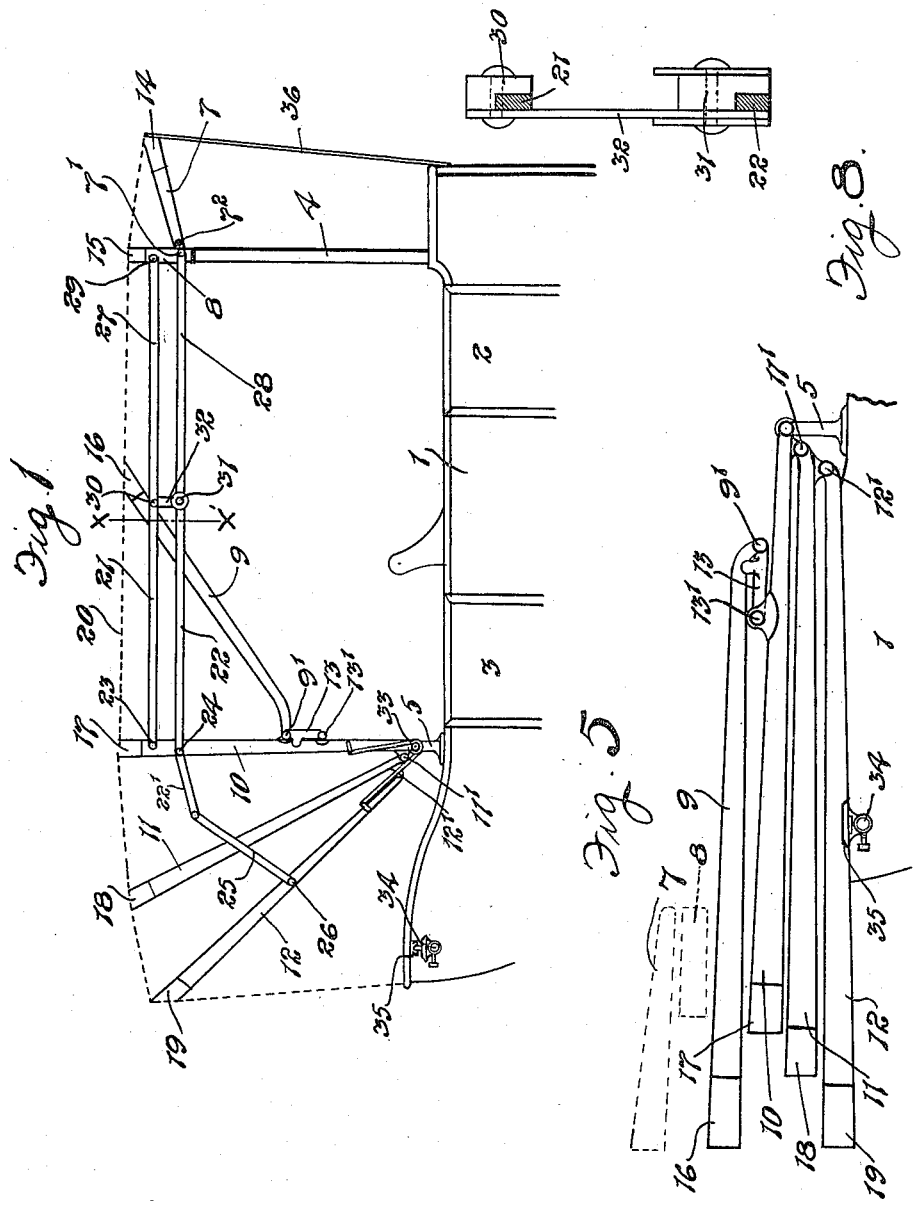

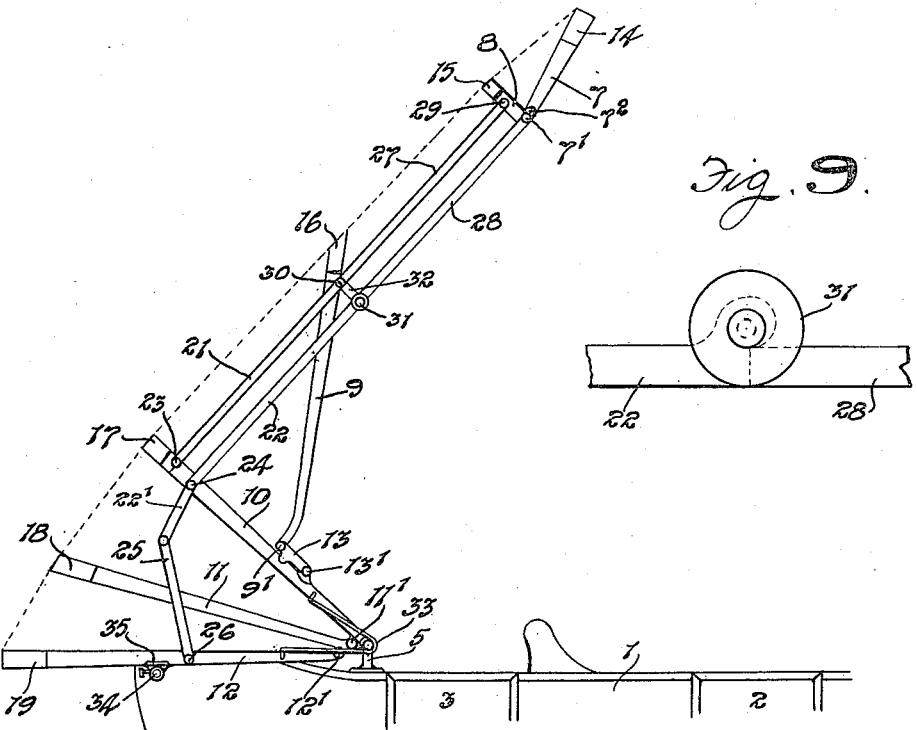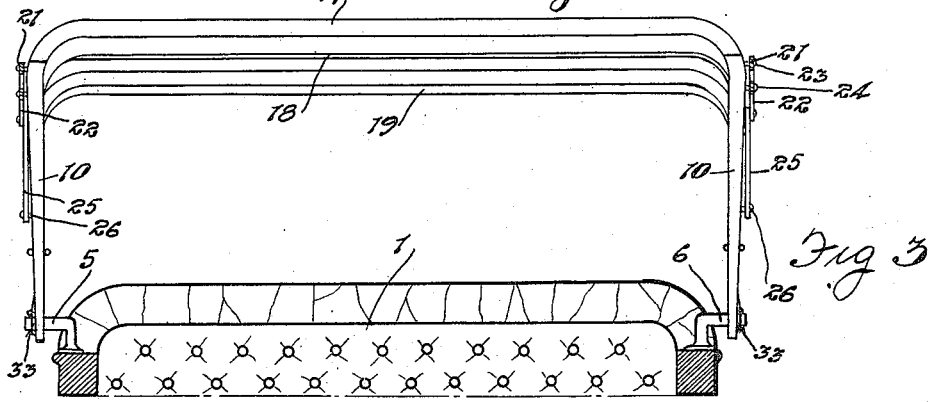

UNITED STATES PATENT OFFICE.

WILLIAM JOHN MOORE AND ROBERT MANSON, OF WINNIPEG, MANITOBA, CANADA.

AUTOMOBILE-TOP.

1,151,033.   Specification of Letters Patent.   Patented Aug. 24, 1915.

Application filed March 17, 1914. Serial No. 825,435.

*To all whom it may concern:*

Be it known that we, WILLIAM JOHN MOORE and ROBERT MANSON, both of the city of Winnipeg, in the Province of Manitoba, Canada, have invented certain new and useful Improvements in Automobile-Tops, of which the following is the specification.

The invention relates to an improvement in automobile tops and the object of the invention is to provide an inexpensive, durable top which can be quickly put up or taken down by one person, an especial feature of the invention being that the parts are arranged to operate so that when the top is being taken down it will not disturb any one in the car.

With the above objects in view the invention consists essentially in the arrangement and construction of parts hereinafter more particularly described and later pointed out in the appended claims.

Figure 1 represents a side view of an automobile equipped with my invention. Fig. 2 represents a side view of a portion of the automobile with the top partially collapsed. Fig. 3 represents a cross sectional view through the top. Fig. 4 represents a side view of the top completely folded. Fig. 5 represents a side view of the top as it appears when folded as in Fig. 4 with the connecting links removed. Fig. 6 represents a side view of the invention in a modified form. Fig. 7 represents a side view of the top appearing in Fig. 6 when folded. Fig. 8 represents an enlarged detailed vertical sectional view through the link, the section being taken in the plane denoted by the line X—X' Fig. 1. Fig. 9 represents a side view of one of the knuckle joints.

In the drawings like characters of reference indicate corresponding parts in each figure.

1 represents the body of an automobile provided with the usual fore door 2, rear door 3 and windshield 4.

5 and 6 represent main standards secured to the body of the machine at either side at a point slightly behind the rear doors 3, the said standards being provided with outstanding pins which carry pivotally six bow sockets, the respective sockets being indicated by the respective numerals, 7, 8, 9, 10, 11 and 12 and being designated by the names front, center front, center, main, center rear and rear sockets. The rear sockets 12 are connected pivotally at 12' to the center rear sockets 11 and these sockets are in turn pivotally connected at 11' to the main socket. The center sockets 9 are each pivotally connected at 9' to extension arms 13 which arms are in turn pivotally connected at 13' to the main socket. The center front sockets 8 are connected to the main sockets by links later described and the front sockets 7 are pivotally connected at 7² to the center front sockets 8. The corresponding bow sockets at each side of the machine are connected by bows 14, 15, 16, 17, 18 and 19, these bows carrying the flexible hood 20.

21 and 22 are a pair of normally horizontally paralleled links (at each side of the top) connected pivotally at 23 and 24 to the main sockets 10, the links 22 in each instance extending rearwardly in the nature of levers 22' behind the pivot point 24 and carrying pivotally an arm 25 in turn connected pivotally at 26 to the rear socket.

27 and 28 are a pair of forward normally horizontally parallel links located on each side of the top connected forwardly at 29 and 7' to the center front sockets 8. The rear ends of the links 27 and 28 are connected by knuckle joints 30 and 31 to the forward ends of the links 21 and 22, the knuckle joints being designed to break when depressed downwardly.

The form of joint used is shown in detail in Figs. 8 and 9 of the drawings and as they are commonly in use it is considered that a detailed explanation is unnecessary.

The connected ends of the front and rear pairs of links are united by a spanning link 32. A spiral spring 33 is mounted on each of the standards 5 and 6 which spring has the extremities thereof extending and engaging with the main and rear sockets, the tendency of the springs being to continuously spread apart the said sockets. A body iron 34 is secured to each side of the body 1 and carries a bow rest 35 designed to receive and support the rear sockets when the top is folded. In actual practice we design the links such that when the top is up and the links extended, the center front sockets rest on the top of the windshield. A strap 36 is utilized at the front and on each side to connect the front bow with the body of the machine.

Considering that one wishes to take down the top it is necessary first to undo the straps 36. One then swings the top on the standards until it comes to the position shown in Fig. 2 with the rear sockets resting on the bow rests. In this connection we wish it to be noted that the top swings away from the heads of the occupants of the car. After the top has been brought to the position shown in the latter figure one next swings the extension arms 13 downwardly to break the pivot joints 9' and then proceeds preferably to the back of the machine and draws the main bow 17 downwardly toward the rear bow 19 and against the action of the springs 33. This latter act causes the knuckle joints to collapse owing to the compression of the arms 25.

The parts are designed such that when the main bow is folded down as far as possible toward the rear bow that the center front bow is drawn back against the main bow to the position shown in Fig. 4 of the drawings. The front bow 14 swings back of itself and when the folding operation is completed the parts are fastened together by straps 37 passing through the bow rests. An envelop can then be placed over the bow as is customary. On the other hand if one wishes to put up the top one just removes the envelop and undoes the straps 37. Immediately this is accomplished the springs operate to expand the top into the position shown in Fig. 2. It is then simply a matter of tilting the top forwardly and fastening the front bow down with the straps 36.

We wish now to make particular reference to Figs. 6 and 7 of the drawings wherein a modification of the invention is shown. In the description preceding it will be noticed that there is no front support other than the windshield for the top. In the modified form shown it will be seen that the center rear sockets have been dispensed with as has also the center socket and the center front sockets have been swung pivotally from front standards 38 secured to the body of the machine at each side immediately behind the foredoors. The front sockets have been releasably connected at 39 to the front center sockets and are arranged so that when disconnected they can be dropped down and connected at a lower point as at 40 to the center front sockets.

The arrangement shown in the modified form is the customary construction for smaller cars with the exception that our paralleled links, arms and springs are supplied. This top folds to the position as shown in Fig. 7 of the drawings it being understood that prior to folding the front sockets are disconnected and fastened at the point 40 and the center front sockets are disconnected from the standards 38 and fastened to the main sockets pivotally at 41.

The essential feature of our invention resides more especially in the application to a top of the paralleled knuckle jointed links, the arms 25 and the springs 33 rather than in the special or detailed arrangement of the sockets.

There are at present many types of tops on the market to which our links, arms and springs could be applied with but little change in the construction of the top being required and once applied the top could be taken down by one person very quickly with but little effort.

What we claim as our invention is;

1. The combination with an automobile body, a pair of pivotally mounted main bow sockets, a pair of pivotally mounted rear bow sockets, a forwardly located pair of bow sockets and bows connecting the respective pairs of sockets, of a rear pair of forwardly extending links connected pivotally to each of the main bow sockets, one of the links of each pair extending to the rear of the main sockets, a forward pair of links connected rearwardly by knuckle joints to the forward ends of the former links and connected pivotally to the forward bow sockets, spanning links connecting the knuckle joints, arms connected pivotally to the rearwardly extending ends of the rear pair of links and pivotally connected to the rear pair of bow sockets and spring means associated with the main and rear bow sockets and designed normally to spread apart the said bow sockets, as and for the purpose specified.

2. The combination with an automobile body, a pair of pivotally mounted main bow sockets a pair of pivotally mounted rear bow sockets, a forwardly located pair of bow sockets and bows connecting the respective pairs of sockets, of pairs of paralleled links having their adjacent ends connected pivotally together by knuckle joints and their outer ends connected respectively to the main bow sockets and to the forward bow sockets, spanning links pivotally connecting the adjacent ends of the former links, spring means normally spreading apart the main and rear bow sockets and means connecting the bow sockets with the main sockets and the links, said means being designed to effect the breaking of the knuckle joints upon the main sockets being turned on their pivot points toward the rear bow sockets, as and for the purpose specified.

3. The combination with the body of an automobile, a pair of main bow sockets pivotally mounted on the body, a pair of pivotally mounted rear bow sockets associated with the main bow sockets, a pair of center front bow sockets, a pair of front sockets pivotally secured to the center front sockets, bows connecting the respective pairs of sockets and a hood mounted on the bows and secured rearwardly to the back of the body; of a rear pair of paralleled horizontally disposed links connected pivotally rearwardly to each pair of main bow sockets, one of the links of each pair extending in the nature of a lever behind the main bow socket, a forward pair of horizontally disposed paralleled links having their rear ends connected to the rear pair of links by knuckle joints and their forward ends pivotally connected to the center front bow sockets, spanning links connecting the knuckle joints, arms pivotally connected to the levers and to the rear bow sockets, spring means normally spreading apart the rear and main bow sockets and means effecting the fastening of the front bow sockets to the front of the body, as and for the purpose specified.

Signed at Winnipeg this 1st day of November 1913.

WILLIAM JOHN MOORE.
ROBERT MANSON.

In the presence of—
G. S. FOXBURGH,
S. SITVERTS.

Copies of this patent may be obtained for five cents each, by addressing the "Commissioner of Patents. Washington, D. C."